United States Patent
Brief et al.

(10) Patent No.: US 7,090,408 B2
(45) Date of Patent: Aug. 15, 2006

(54) RUGGEDIZED MODULE FOR SECURELY RETAINING MULTI-OPTICAL FIBER INTERCONNECT FERRULES

(75) Inventors: Joseph Benjamin Brief, Satellite Beach, FL (US); Ying-Ming Lee, Melbourne, FL (US); Robert Grayson Wells, Melbourne Beach, FL (US); James William Carpenter, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 174 days.

(21) Appl. No.: 10/816,323

(22) Filed: Apr. 1, 2004

(65) Prior Publication Data
US 2005/0220422 A1    Oct. 6, 2005

(51) Int. Cl.
G02B 6/38    (2006.01)

(52) U.S. Cl. .......................... 385/71; 385/72

(58) Field of Classification Search .................. 385/72
See application file for complete search history.

(56) References Cited

U.S. PATENT DOCUMENTS 5,689,598 A    11/1997    Dean, Jr. et al. .............. 385/59
6,276,840 B1    8/2001    Weiss et al. .................. 385/59
6,505,976 B1 *  1/2003    Grois et al. ................... 385/78
6,632,023 B1 * 10/2003    Ogawa et al. ................ 385/53
6,754,960 B1 *  6/2004    Shiraishi et al. ............. 30/90.6

FOREIGN PATENT DOCUMENTS

JP          10160968 A  *  6/1998

* cited by examiner

Primary Examiner—Juliana Kang
(74) Attorney, Agent, or Firm—Allen, Dyer, Doppelt, Milbrath & Gilchrist, P.A.

(57) ABSTRACT

A ruggedized, snap-together, module securely retains a pair of mutually abutting fiber optic interconnect MT ferrules, that have been joined together by a ferrule aligning pin clamp structure. The module includes a generally rectangular base member having a ferrule retention cavity that is configured to retain a pair of MT ferrules and an associated pin clamp assembly therefor. A cover is configured to engage the base in such a manner that the two MT ferrules are firmly held in their intended face-to-face abutting condition as captured between the base and the cover. A bias compression spring is captured between the cover and the base in a manner that facilitates removal of the cover when it is desired to open the module and gain access to the two MT ferrules.

14 Claims, 5 Drawing Sheets

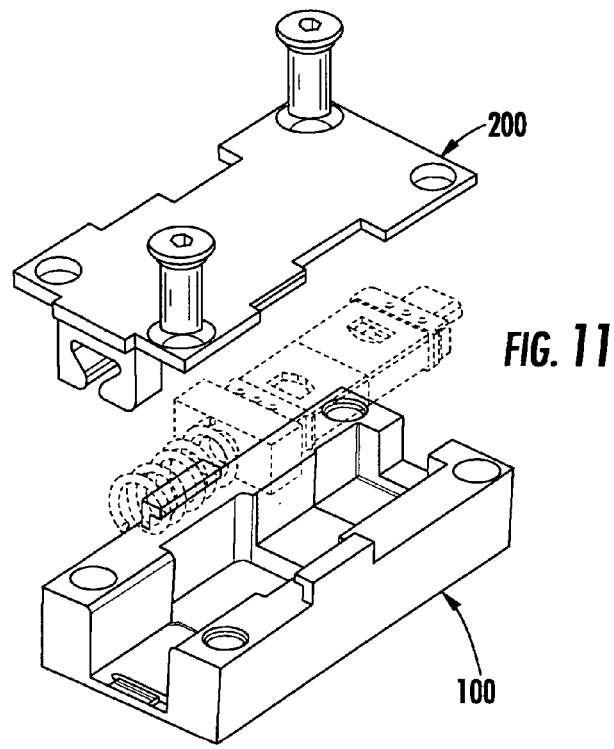
FIG. 11
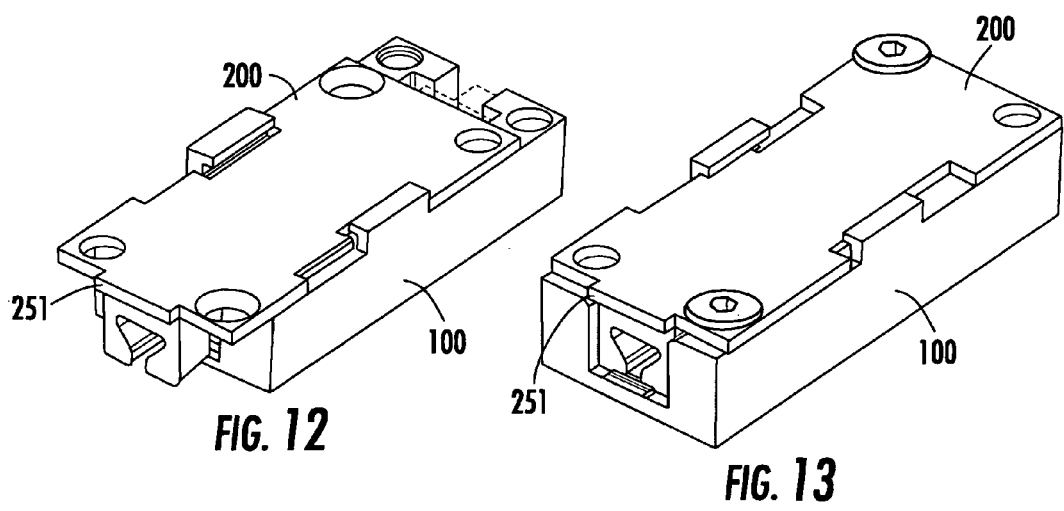
FIG. 12
FIG. 13

RUGGEDIZED MODULE FOR SECURELY RETAINING MULTI-OPTICAL FIBER INTERCONNECT FERRULES

This invention was made with Government support under U.S. Government Contract No. N0019-02-C-3002. The Government has certain rights in this invention.

FIELD OF THE INVENTION

The present invention relates in general to fiber optic subsystems and components therefor, and is particularly directed to a hew and improved ruggedized, snap-together, module for securely retaining therein a pair of mutually abutting fiber optic interconnect MT ferrules, that have been joined together by a ferrule aligning pin clamp structure.

BACKGROUND OF THE INVENTION

FIG. 1 is a diagrammatic perspective view of an arrangement for joining, in end-to-end abutting relationship, a pair of multi optical fiber terminations configured as MT ferrules 10L and 10R. As shown therein, and further in the side view of FIG. 2 and the top view of FIG. 3, each MT ferrule terminates a plurality (e.g., eight to twelve, as a non-limiting example) of optical fibers that are contained in a section of fiber optic ribbon cable 20. Within each MT ferrule proper, the optical fibers extend to and are terminated flush with a front or end face 11, as shown at 21.

In order to join the two MT ferrules together, so that the optical fibers in the two ferrules may directly abut one another, each ferrule contains a pair of parallel longitudinal bores 12, 13 which extend all the way through each ferrule from a rear face 14 to the front face 11. These longitudinal bores are sized to receive alignment pins, shown at 31 and 32, which extend from a pin clamp assembly 30.

In particular, the pin clamp assembly 30 is typically configured of a pair of interlocking members that fit around a fiber ribbon grommet through which the ribbon cable extends from the MT ferrule, and contain respective alignment pins 31, 32 extending therefrom. When the two halves of the pin clamp assembly are joined together, their respective alignment pins 31, 32 are parallel with one another, so that they may be readily insertable all the way through the bores 12 and 13 of one of the ferrules and project from the front face 11 of that ferrule (the leftmost ferrule 10L as viewed in FIGS. 1, 2 and 3) a prescribed distance. This projection of the alignment pins from the one MT ferrule enables the pins to be readily accommodated by the bores 12, 13 of the other ferrule (the rightmost ferrule 10R as viewed in FIGS. 1, 2 and 3).

FIG. 4 is a diagrammatic plan view showing the two MT ferrules joined together by the use of such a pin clamp assembly, wherein the alignment pins 31 and 32 of pin clamp assembly 30 extend through the entire bores 12 and 13 of the leftmost ferrule 10L and protrude part way into the bores 12 and 13 of the rightmost ferrule 10R. When mutually aligned and joined together in this manner, the two MT ferrules provide flush contact and alignment of the optical fibers that terminate at their abutting front faces 11. What is needed is a structure having a reasonably sized form factor that will securely and robustly retain the two MT ferrules in this aligned position, yet will allow the two ferrules to be disengaged from one another when a prescribed disconnection technique is employed.

SUMMARY OF THE INVENTION

In accordance with the present invention, this objective is successfully achieved by means of a ruggedized module that is comprised of three component parts: 1—a generally rectangular base member having a ferrule retention cavity that is configured to retain a pair of MT ferrules and an associated pin clamp assembly therefor; 2—a cover that is configured to engage the base in such a manner that the two MT ferrules are firmly held in their intended face-to-face abutting condition as captured between the base and the cover; and 3—a bias compression spring that is captured between the cover and the base in a manner that facilitates removal of the cover when it is desired to open the module and gain access to the two MT ferrules housed thereby and spring loads the MT contacts together.

More particularly, the module's base member is configured as a rectangular member having a planar bottom surface and pair of planar sidewalls that form an MT ferrule retention cavity therebetween. Bores are formed in the corners of the sidewalls to secure the cover to the base member and to secure the module to a mounting surface. A pair of generally inverted L-shaped rails extend above the sidewalls on opposite sides of the ferrule retention cavity. These rails cooperate with associated gaps in the cover, so that the base member and the cover may be readily slideably joined together. One of the base member's end walls has a slot that is sized to receive a foot member of the cover and a compression spring that facilitates removal of the cover when it is desired to open the module and gain access to the two MT ferrules housed thereby and spring loads the MT ferrules together. In addition, the bottom of the slot has a lip that serves as a closure stop for the foot or endwall of the cover. The other endwall has a gap that is sized to accommodate a fiber ribbon grommet through which the ribbon cable extends from the MT ferrule. The lid or cover portion of the module has a generally rectangularly configured planar top surface, corners of which contain bores for receiving fittings for attaching the cover to the base member and attaching the module to a support structure. The planar top surface further includes a pair of recesses which are sized to clear the inverted-L shaped rails of the base member, so as to allow the lid to slide along the top surfaces of the sidewalls of the base member. Immediately adjacent to these recesses is a pair of indentations which provide side clearance for the lid past the rails as the lid is placed upon and slides along the top surfaces of the sidewalls of the base member.

One end of the module cover further includes a slotted end wall or foot member having a generally triangular shaped slot that is sized to accommodate ease of entry and removal of a section of fiber ribbon cable through the slot. The bottom of the slotted end wall member has a bevelled surface that allows the end wall member to ride over the lip adjacent to the end wall of the base member which serves as a closure stop for the endwall of the cover. The cover further includes regions of stepwise increased thickness, which overlie the MT ferrules and serve to provide a 'snug' lid closure therefor.

When employing the module to securely retain a pair of mutually abutting MT ferrules, first the MT ferrules are joined together using the alignment pin assembly. Once so joined the two MT ferrules are placed directly above the cavity regions of the base member and are then allowed to drop-fit into the cavity regions of the base member. In addition, the bias compression spring is placed over the fiber ribbon cable feeding the end of the MT modules wherein the alignment pis assembly is located.

Next, the fiber ribbon cable is fed through the slot in the foot member of the cover. The cover is then located above the base member and lowered into position such that sidewall recesses thereof are aligned with the rails of the base member. The cover is then lowered onto the top surfaces of the base member. In this position the compression spring is captured between the foot member and the alignment pin assembly. Next, the cover member is pushed forward as it slides along the top surface of the base member. During this motion, the foot member rides up and over the lip in the base member and then 'snap'locks the lid in position, once the bottom of the foot member has cleared the Lip. In this fully closed condition, fittings, such as screws may be used to securely close the lid to the base member. The module may then be attached to a support surface or substrate by way of the opposing corner apertures.

When it is desired to remove the lid from the base member, it is initially necessary to remove any corner fittings that effectively lock the lid to the base member. With any such fittings removed, a slight upward and outward force is exerted beneath the front edge of the lid member, as with the end of a finger or small screwdriver and the like. This slight force is aided by the bias imparted by the compression spring to cause the foot member to rise up and past the lip in the base member, so as to bring the lid to a position, that allows it to be directly lifted off the base member, providing access to the MT ferrules.

BRIEF DESCRIPTION OF THE DRAWINGS

FIG. 11 is a diagrammatic exploded perspective view of the ruggedized MT ferrule retaining module of the invention;

FIG. 12 is a diagrammatic perspective view of the ruggedized MT ferrule retaining module of the invention, showing engagement of the lid with the base member; and FIG. 13 is a diagrammatic perspective view of the ruggedized MT ferrule retaining module of the invention, showing sliding closure of the lid with the base member.

DETAILED DESCRIPTION

As described briefly above, the ruggedized module of the present invention is comprised of three component parts: 1—a base member, which may be made of a lightweight metallic material, such as aluminum, having a ferrule retention cavity that receives therein a pair of MT ferrules and an associated pin clamp assembly therefor; 2—a cover or lid, which is also made of aluminum and is configured to engage the base in such a manner that the two MT ferrules remain in their intended face-to-face abutting condition when captured therebetween, while the module is closed against the entry of foreign matter; and 3—a bias compression spring that is captured between the cover and the base in a manner that facilitates removal of the cover when it is desired to open the module and gain access to the two MT ferrules housed thereby.

Figure 6:
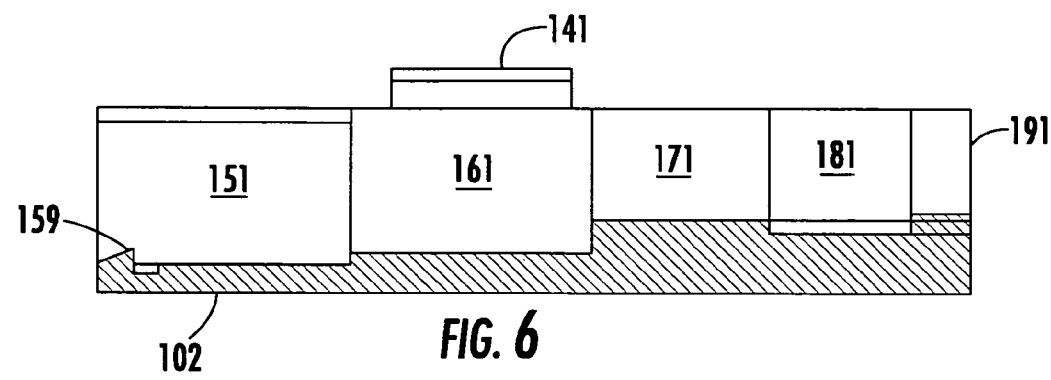
FIG. 5 is a diagrammatic perspective view and FIG. 6 is a diagrammatic side view of a base member of the ruggedized MT ferrule retaining module of the invention.
Figure 5:
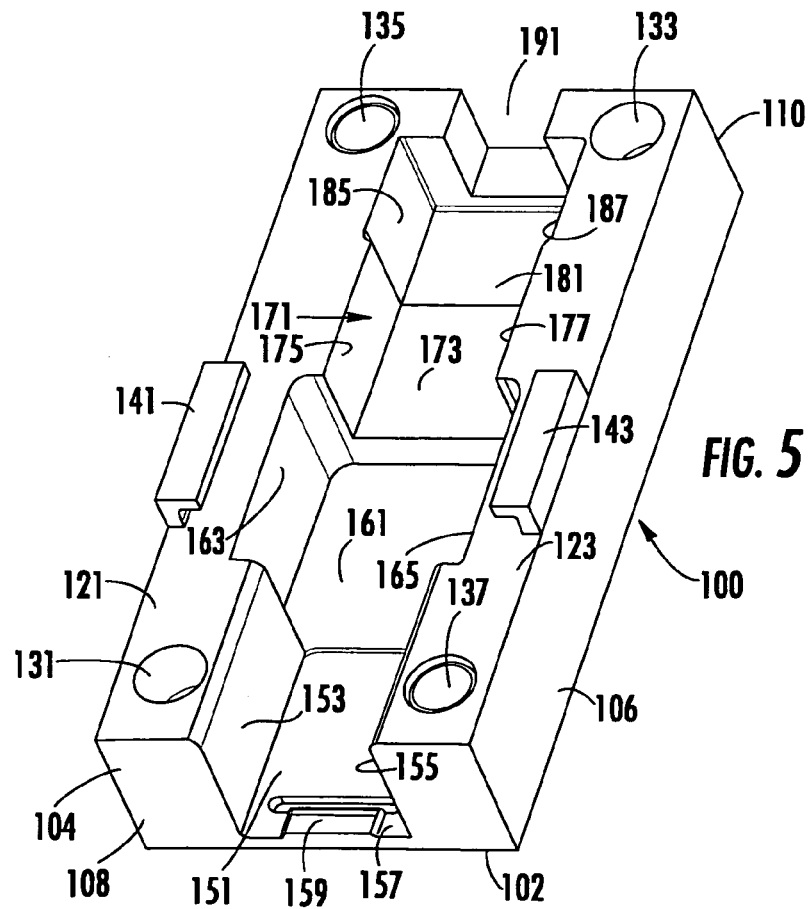

Attention is now directed to FIG. 5 which is a diagrammatic perspective view and FIG. 6, which is a diagrammatic side view of base member 100, which is configured as a generally rectangular member having a generally planar bottom surface 102, and pair of generally planar sidewalls 104 and 106, and endwalls 108 and 110 that extend orthogonally from the bottom surface 102. Sidewall 104 has a generally flat top surface 121, while sidewall 106 has a generally flat top surface 123, that is coplanar with top surface 121 of sidewall 104. A first corner bore 131 extends through the top surface 121 of sidewall 104, while a second corner bore 133, that diagonally opposes corner bore 131, extends through the top surface 123 of sidewall 106. These corner bores are sized to receive suitable fittings, such as screws and the like, for mounting the base to an adjacent support surface. A first threaded corner bore 135 extends through the top surface 121 of sidewall 104, while a second threaded corner bore 137, that diagonally opposes corner bore 135, extends through the top surface 123 of sidewall 106. These threaded corner bores are sized to receive suitable fittings, such as screws and the like, for securing the lid to the base.

A generally inverted L-shaped rail 141 extends from the top surface 121 of sidewall 104, while a similar generally inverted L-shaped rail 143 extends from the top surface 123 of sidewall 106. These rails cooperate with associated gaps in the lid so that the base and the lid may be readily joined together, as will be described. End wall 108 has a first recessed region or slot 151 that is bounded by sidewall surfaces 153 and 155 and extends a prescribed distance toward the endwall 110. This recessed region or slot 151 is sized to receive a foot member of the cover and a compression spring that facilitates removal of the cover when it is desired to open the module and gain access to the two MT ferrules housed thereby, as will be described. In addition, the bottom 157 of the slot 151 has a lip 159 adjacent to the end wall 108 that serves as a closure stop for the foot or endwall of the cover, as will be described.

Recess 151 extends to a generally centrally located cavity 161 that is bounded by sidewall surfaces 163 and 165, which are adjacent to the rails 141 and 143, respectively. Cavity 161 is sized to accommodate the pin clamp assembly 30 and a portion of an adjacent MT ferrule through which the pins of the pin clamp assembly extend, described above with reference to FIGS. 1–4. Extending from the cavity 161 is a further recess region 171 that is defined by a floor region 173 and a pair of sidewall surfaces 175 and 177.

Recess region 171 is adjoined by an slot 181 that is defined by a floor region 183 and a pair of sidewall surfaces 185 and 187, the separation between which is slightly wider than the separation between sidewall surfaces 175 and 177. Recess 171 and slot cooperate with. cavity 161 and are sized to accommodate MT ferrules of the type shown in FIGS. 1–4 described above. A gap 191 is formed in the endwall 110 so as to provide an entryway therethrough to the recess 181.

Gap 191 is sized to accommodate a fiber ribbon grommet through which the ribbon cable extends from the MT ferrule, as described above.

Figure 7:
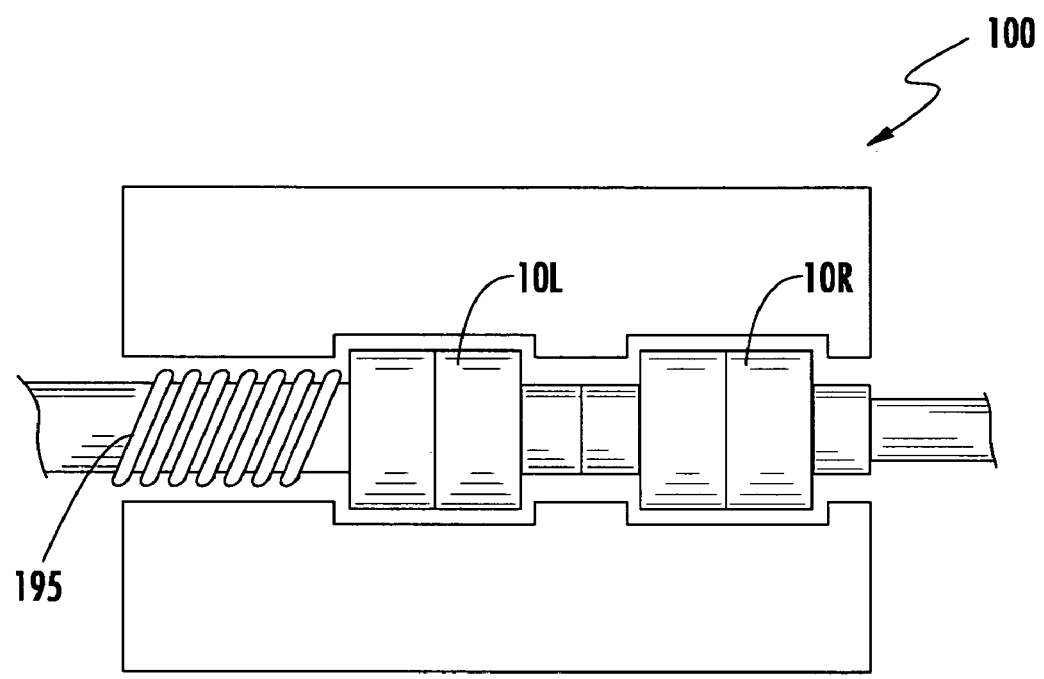
FIG. 7 is a plan view and FIG. 8 is a diagrammatic perspective view of the manner in which a pair of MT ferrules, 'drop-fit' within and are retained by the cavity structure of the base member of FIGS. 5 and 6.
Figure 8:
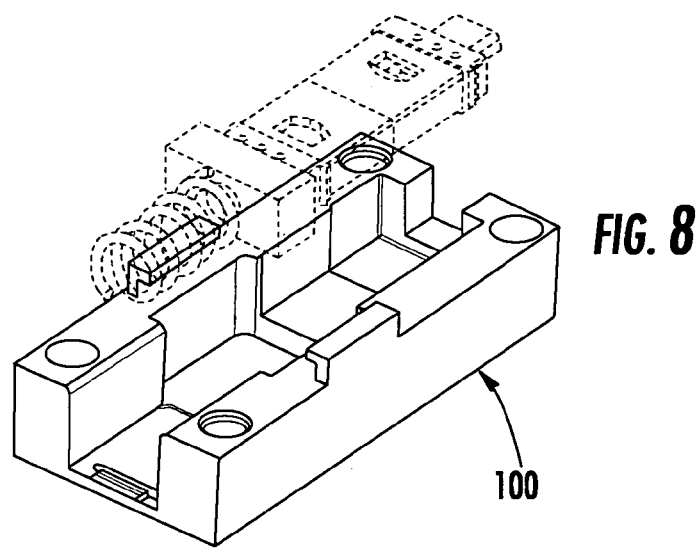

FIG. 7 is a plan view and FIG. 8 is a diagrammatic perspective view of the manner in which a pair of MT ferrules, as captured by an alignment pin assembly readily 'drop-fit' within and are retained by the cavity structure of the base member 100. Also shown in these Figures is the bias compression spring 195 which, as described above surrounds the fiber ribbon cable and is accommodated in slot 151.

Figure 1:
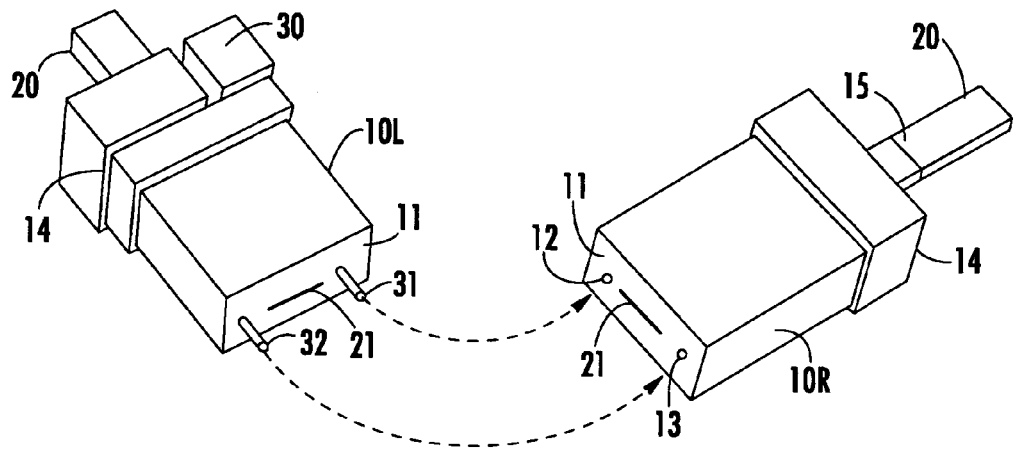
FIG. 1 is a diagrammatic perspective view of an arrangement for joining, in end-to-end abutting relationship, a pair of multi optical fiber terminations configured as MT ferrules.
Figure 2:
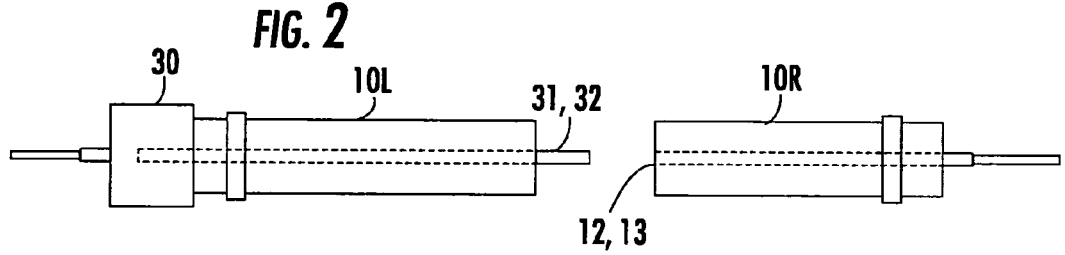
FIGS. 2 and 3 are respective side and top views of the MT ferrule arrangement of FIG. 1.
Figure 3:
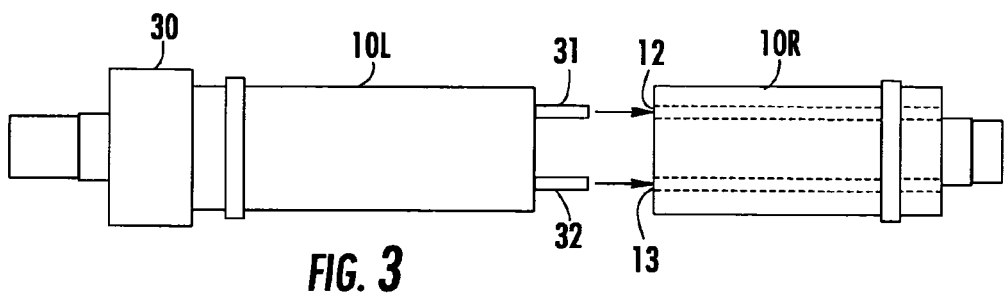
Figure 4:
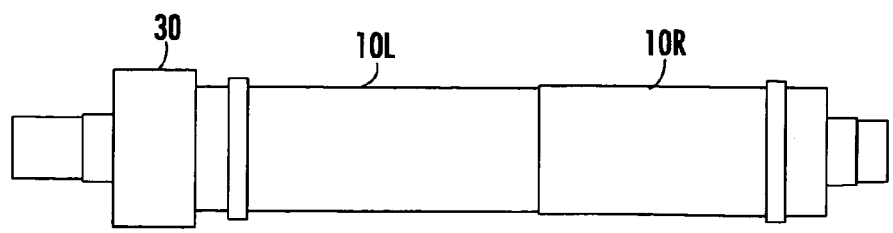
FIG. 4 is a diagrammatic plan view showing two MT ferrules joined together by a pin clamp assembly.
Figure 10:
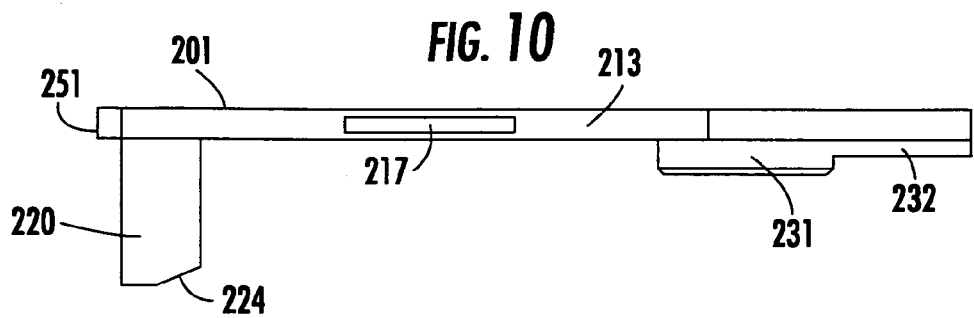
FIG. 9 is a diagrammatic perspective view and FIG. 10 is a diagrammatic side view of a lid member of the ruggedized MT ferrule retaining module of the invention.
Figure 9:
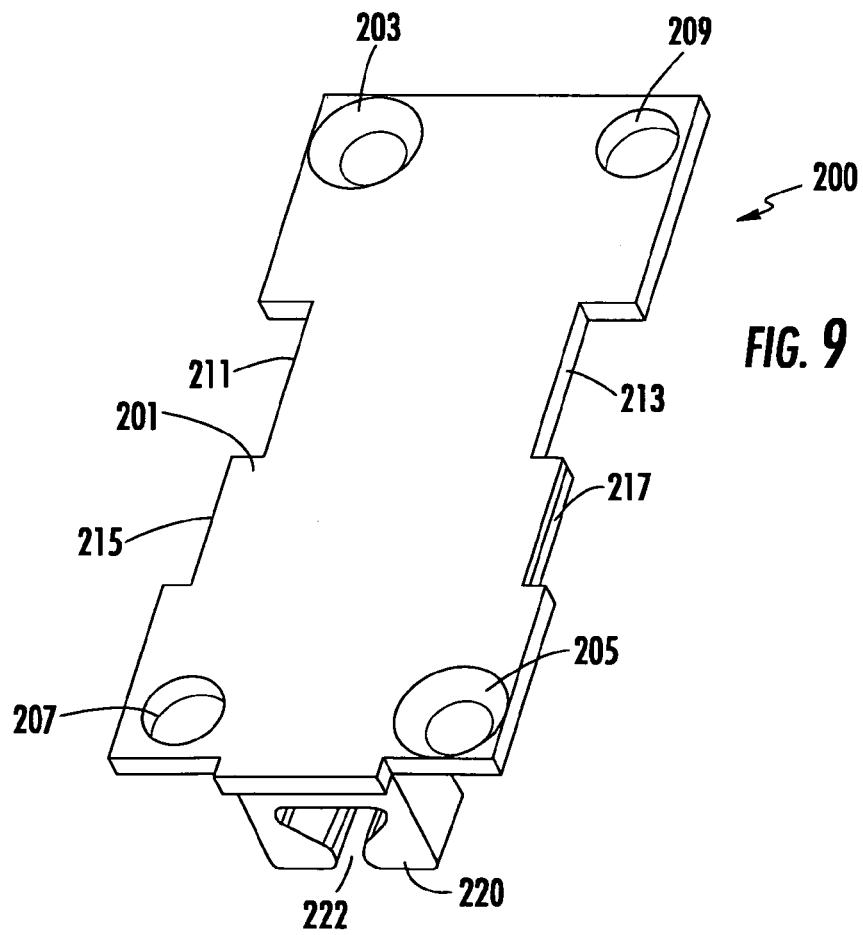

Attention is now directed to FIGS. 9 and 10, which are respective diagrammatic perspective and side views of the lid or cover 200 that is configured to engage the module's base member 100 described above. As shown therein, the lid member has a generally rectangularly configured planar top surface 201, in a first pair of diagonally opposing corners of which are formed recesses 203 and 205 for receiving fitting, such as screws and the like that engage threaded bores 135 and 137 of the base member 100. The other corner regions of the lid have apertures 207 and 209 for receiving fittings that pass through apertures. 131 and 133 of the base member for mounting the connector retention module to a support surface.

The planar top surface further includes a pair of recesses 211 and 213, which are sized to clear the inverted-L shaped rails 141 and 143 of the base member, so as to allow the lid to slide along the top surfaces 121 and 123 of the sidewalls of the base member 100. Immediately adjacent to recesses 211 and 213 are a pair of indentations 215 and 217, which provide side clearance for the lid past the rails 141 and 143 as the lid is placed upon and slides along the top surfaces 121 and 123 of the sidewalls of the base member.

As further shown in FIG. 9 and also in the side view of FIG. 10, the lid member 200 contains a slotted end wall or foot member 220 at an end of the lid member that engages the recess 151 thereof. The slotted end wall member 220 has a generally triangular shaped slot 222 that is sized to accommodate ease of entry and removal of a section of fiber ribbon cable through the slot. As shown in the side view of FIG. 10, the bottom of the slotted end wall member 220 has a bevelled surface 224 that allows the end wall member to ride over the lip 159 adjacent to the end wall 108 of the base member 100 which also serves as a closure stop for the endwall of the lid. Also shown in the side view of FIG. 10 are regions 231 and 232 of stepwise increased thickness, which overlie the MT ferrules and serve to provide a 'snug' lid closure therefor.

The manner in which the module is used to securely retain therein a pair of mutually abutting MT ferrules may be readily understood by reference to FIGS. 7,8 and 11–13. First the MT ferrules are joined together using the alignment pin assembly described above and shown in FIG. 4. Once so joined the two MT ferrules are placed directly above the cavity regions of the base member as shown in FIG. 8. They are then allowed to drop-fit into the cavity regions of the base member as shown in FIG. 7. In addition, the bias compression spring 195 is placed over the fiber ribbon cable feeding the end of the MT modules wherein the alignment pis assembly is located.

Next, fiber ribbon cable is fed through the slot 222 in the foot member 220 of lid member 200. Then, as shown in FIG. 11, lid member 200 is then located above the base member and lowered into position such that sidewall recesses 211 and 213 thereof are aligned with the rails 141 and 143 of the base member. The lid member is now lowered onto the top surfaces 121 and 123 of the base member as shown in FIG. 12. In this position, the compression spring is captured between the foot member 220 and the alignment pin assembly 30. Next, the cover member is pushed forward towards end wall 110, so that the lid slides along the top surfaces 121 and 123 of the base member. During this motion, the foot member 220 rides up and aver the lip 159 in the base member and then 'snap'-locks the lid in portion, once the bottom of the foot member 220 has cleared the lip 159. In this fully closed condition, fasteners, such as screws 241 and 242 shown in FIG. 13 may be used to securely attach the lid to the base member. The module may then be attached to a support surface or substrate by way of the opposing corner apertures, as described above (or alternatively, may be epoxied in place).

When it is desired to remove the lid from the base member, it is initially necessary to remove any corner fittings that effectively lock the lid to the base member. With any such fittings removed, a slight upward and outward force is exerted beneath the front edge 251 of the lid member, as with the end of a finger or small screwdriver and the like. This slight force is aided by the bias imparted by the compression spring to cause the foot member 220 to rise up and past the lip 159 in the base member, so as to bring the lid from its position shown in FIG. 13 to its position shown in FIG. 12. In this position, the lid may be directly lifted off the base member, providing access to the MT ferrules.

While we have shown and described an embodiment in accordance with the present invention, it is to be understood that the same is not limited thereto but is susceptible to numerous changes and modifications as known to a person skilled in the art. For example, the invention is not limited to a single MT connection, but is readily expandable to multi-MT connections, such as, but not limited to, double wide, triple wide MT connections. Also, being a discrete device, not part of the hardware, facilitates mounting the device to any surface at various angles and directions. Mounting may be effected by fasteners or epoxied. We therefore do not wish to be limited to the details shown and described herein, but intend to cover all such changes and modifications as are obvious to one of ordinary skill in the art.

What is claimed is :

1. A module for securely retaining therein a pair of multi fiber optic MT ferrules comprising:
    a base member having a ferrule retention cavity that is configured to retain a pair of fiber optic MT ferrules and an associated pin clamp assembly therefor;
    a cover that is configured to placed upon and slide along a top surface of the base member in such a manner that the two MT ferrules are firmly held in their intended face-to-face abutting condition as captured between the base member and the cover; and
    a bias compression spring that is captured between the cover and the base member in a manner that facilitates removal of the cover to gain access to the two MT ferrules housed thereby; and wherein
    said base member is configured as a generally rectangular shaped member having a planar bottom surface and pair of planar sidewalls that form an MT ferrule retention cavity therebetween, and includes a pair of cover retention elements that extend above the side walls on opposite sides of the ferrule retention cavity and are configured to allow said cover to be placed upon and slide along said top surface of said base member so that said cover way be retained between said cover retention elements and said top surface of said base member.

2. The module according to claim 1, wherein said cover has a generally planar surface with recesses in the sides thereof that allow passage thereby of said rails of said base member, so that the base member and the cover may be readily slidably joined together.

3. The module according to claim 2, wherein said cover further includes a pair of indentations which provide side clearance for said cover past the cover retention elements of said base member when said cover is placed upon and slides along the top surfaces of sidewalls of the base member.

4. TM module according to claim 2, wherein said cover further includes a foot member that abuts against said compression spring and is sized to enter a slot in an endwall of said base member, wherein said slot has a lip that serves as a closure stop for the foot member of said cover.

5. The module according to claim 4, wherein said foot member has a generally triangular shaped slot that is sized to accommodate ease of entry and removal of a section of fiber ribbon cable therethrough, and wherein & bottom region of said foot member has a levelled surface that allows the foot member to ride over the lip adjacent to the end wall of the base member which serves as a closure stop for the endwall of the cover.

6. The module according to claim 1, wherein said cover retention elements comprise respective generally inverted L-shaped rails.

7. A method of securely retaining a pair of fiber optic MT ferrules in mutually abutting relationship, while protecting said ferrules from being impacted by foreign matter comprising the steps of;
 (a) providing
  1—a base member having a ferrule retention cavity that is configured to retain a pair of fiber optic MT ferrules and an associated pin clamp assembly therefor,
  2—a cover that is configured to engage the base in such a manner that the two MT ferrules are firmly held in their intended face-to-face abutting condition as captured between the base and the cover, and
  3—a bias compression spring that is adapted to be captured between the cover and the base in a manner that facilitates removal of the cover to gain access to the two NIT ferrules housed thereby,
 (b) joining said MT ferrules together using an alignment pin assembly therefor;
 (c) placing said MT ferrules as joined together in step (b) into the ferrule retention cavity of the base member;
 (d) placing said bias compression spring over the fiber ribbon cable feeding the end of the MT ferrules wherein the alignment pin assembly is located;
 (e) feeding said fiber ribbon cable through a slot in a foot member of said cover;
 (f) locating sad cover above the base member such that sidewall recesses thereof are aligned with rails of the base member;
 (g) lowering said cover onto top surfaces of the base member, and causing said compression spring to be captured between the foot member and the alignment pin, assembly; and
 (h) sliding said cover along the top surface of the base member, so that said foot member rides up and over a lip in the base member and then 'snap'locks the lid in position, once the bottom of the foot member has cleared the lip.

8. A module for securely retaining therein a pair of multi fiber optic MT ferrules comprising:
 a generally rectangular base member having a ferrule retention cavity that is configured to retain a pair of mutually face-to-face abutting fiber optic MT ferrules; and
 a cover that is configured to be placed upon and slide along a top surface of the base member in such a manner that the two MT ferrules are firmly held in their intended face-to-face abutting condition as captured between the base member and the cover, and such that said cover is snap-fit locked onto said base member; and wherein
 said base member is configured as a generally rectangular shaped member having a planar bottom surface and a pair of planar side walls that form an MT ferrule retention cavity therebetween, and includes a pair of cover retention elements that extend above the side walls on opposite sides of the ferrule retention cavity and are configured to allow said cover to be placed upon and slide along said top surface of said base member, so that said cover may be retained between said cover retention elements and said top surface of said base member.

9. The module according to claim 8, further comprising a bias compression spring that is captured between the cover and the base member in a manner that facilitates removal of the cover to gain access to the two MT ferrules retained thereby.

10. The module according to claim 9, wherein said cover has a generally planar surface with recesses in the sides thereof that allow passage thereby of said rails of said base member, so that the base member and the cover may be readily slidably joined together.

11. The module according to claim 10, wherein said cover further includes a pair of indentations which provide side clearance for said cover past the cover retention elements of said base member when said cover is placed upon and slides along the top surfaces of sidewalls of the base member.

12. The module according to claim 10, wherein said cover further includes a foot member that abuts against said compression spring and is sized to enter a slot in an endwall of said base member, wherein said slot has a lip that serves as a closure stop for the foot member of said cover.

13. The module according to claim 12, wherein said foot member has a generally triangular shaped slot that is sized to accommodate ease of entry and removal of a section of fiber ribbon cable therethrough, and wherein a bottom region of said foot member has a bevelled surface that allows the foot member to ride over the lip adjacent to the end wall of the base member which serves as a closure stop for the endwall of the cover.

14. The module according to claim 8, wherein said cover retention elements comprise respective generally inverted L-shaped rails.

* * * * *

UNITED STATES PATENT AND TRADEMARK OFFICE
CERTIFICATE OF CORRECTION

PATENT NO. : 7,090,408 B2
APPLICATION NO. : 10/816323
DATED : August 15, 2006
INVENTOR(S) : Brief et al.

It is certified that error appears in the above-identified patent and that said Letters Patent is hereby corrected as shown below:

| | |
|---|---|
| Column 1, Line 14 | Delete: "directed to a hew"<br>Insert: --directed to a new-- |
| Column 2, Line 28 | Delete: "base member's end walls"<br>Insert: --base member's endwalls-- |
| Column 2, Line 43 | Delete: "the inverted-L shaped"<br>Insert: --the inverted L-shaped-- |
| Column 2, Line 50 | Delete: "includes a slotted end"<br>Insert: --includes a slotted end- -- |
| Column 2, Line 54 | Delete: "slotted end wall member"<br>Insert: --slotted endwall member-- |
| Column 2, Line 55 | Delete: "allows the end wall member"<br>Insert: --allows the endwall member-- |
| Column 2, Line 56 | Delete: "to the end wall"<br>Insert: --to the endwall-- |
| Column 3, Line 2 | Delete: "alignment pis assembly is located."<br>Insert: --alignment pin assembly is located.-- |
| Column 3, Line 8 | Delete: "In this position the"<br>Insert: --In this position, the-- |
| Column 3, Line 13 | Delete: "then 'snap'locks the lid"<br>Insert: --then 'snap'-locks the lid-- |
| Column 3, Line 14 | Delete: "has cleared the Lip."<br>Insert: --has cleared the lip.-- |
| Column 4, Line 40 | Delete: "End wall 108"<br>Insert: --Endwall 108-- |
| Column 4, Line 48 | Delete: "adjacent to the end"<br>Insert: --adjacent to the end- -- |

UNITED STATES PATENT AND TRADEMARK OFFICE
CERTIFICATE OF CORRECTION

PATENT NO. : 7,090,408 B2
APPLICATION NO. : 10/816323
DATED : August 15, 2006
INVENTOR(S) : Brief et al.

It is certified that error appears in the above-identified patent and that said Letters Patent is hereby corrected as shown below:

| | |
|---|---|
| Column 4, Line 60 | Delete: "adjoined by an slot 181"<br>Insert: --adjoined by a slot 181-- |
| Column 4, Line 64 | Delete: "slot cooperate with. cavity 161"<br>Insert: --slot cooperate with cavity 161-- |
| Column 5, Line22 | Delete: "through apertures. 131"<br>Insert: --through apertures 131-- |
| Column 5, Line 26 | Delete: "clear the inverted-L shaped"<br>Insert: --clear the inverter L-shaped-- |
| Column 5, Line 35 | Delete: "slotted end wall or"<br>Insert: --slotted endwall or-- |
| Column 5, Line 37 | Delete: "The slotted end wall member"<br>Insert: --The slotted endwall member-- |
| Column 5, Line 41 | Delete: "slotted end wall member 200 has"<br>Insert: --slotted endwall member 200 has-- |
| Column 5, Line 42 | Delete: "that allows the end wall member"<br>Insert: --that allows the endwall member-- |
| Column 5, Line 43 | Delete: "adjacent to the end wall 108"<br>Insert: --adjacent to the endwall 108-- |
| Column 5, Line 60 | Delete: "pis assembly is located."<br>Insert: --pin assembly is located.-- |
| Column 6, Line 4 | Delete: "end wall 110,"<br>Insert: --endwall 110,-- |
| Column 6, Line 6 | Delete: "up and aver the lip 159"<br>Insert: --up and over the lip 159-- |
| Column 6, Line 7 | Delete: "the lid in portion,"<br>Insert: --the lid in position,-- |

UNITED STATES PATENT AND TRADEMARK OFFICE
CERTIFICATE OF CORRECTION

PATENT NO. : 7,090,408 B2  
APPLICATION NO. : 10/816323  
DATED : August 15, 2006  
INVENTOR(S) : Brief et al.

It is certified that error appears in the above-identified patent and that said Letters Patent is hereby corrected as shown below:

| | |
|---|---|
| Column 6, Line 48 | Delete: "configured to placed upon"<br>Insert: --configured to be placed upon-- |
| Column 6, Line 65 | Delete: "said base member so that"<br>Insert: --said base member, so that-- |
| Column 7, Line 11 | Delete: "4. TM module according to claim 2,"<br>Insert" --4. The module according to claim 2,-- |
| Column 7, Line 19 | Delete: "and wherein & bottom"<br>Insert" --and wherein a bottom-- |
| Column 7, Line 20 | Delete: "member a leveled surface"<br>Insert" --member has a bevelled surface-- |
| Column 7, Line 21 | Delete: "lip adjacent to the end wall"<br>Insert" --lip adjacent to the endwall-- |
| Column 7, Line 30 | Delete: "prising the steps of;"<br>Insert" --prising the steps of:-- |
| Column 7, Line 43 | Delete: "the two NIT ferrules"<br>Insert" --the two MT ferrules-- |
| Column 7, Line 53 | Delete: "(f) locating sad cover"<br>Insert" --(f) locating said cover-- |
| Column 8, Line 1 | Delete: "and then 'snap'locks the lid in"<br>Insert: --and then 'snap'-locks the lid in-- |
| Column 8, Line 19 | Delete: "pair of planar side walls that"<br>Insert: --pair of planar sidewalls that-- |

UNITED STATES PATENT AND TRADEMARK OFFICE
CERTIFICATE OF CORRECTION

PATENT NO. : 7,090,408 B2
APPLICATION NO. : 10/816323
DATED : August 15, 2006
INVENTOR(S) : Brief et al.

It is certified that error appears in the above-identified patent and that said Letters Patent is hereby corrected as shown below:

Column 8, Line 55     Delete: "end wall of the base member"
                                  Insert: --endwall of the base member--

Signed and Sealed this

Twenty-first Day of November, 2006

JON W. DUDAS
*Director of the United States Patent and Trademark Office*